United States Patent
Hsu

(10) Patent No.: US 8,704,808 B2
(45) Date of Patent: Apr. 22, 2014

(54) LIQUID CRYSTAL DISPLAY DEVICE

(75) Inventor: Chuan-Chien Hsu, Tainan (TW)

(73) Assignee: Himax Technologies Limited, Tainan (TW)

(*) Notice: Subject to any disclaimer, the term of this patent is extended or adjusted under 35 U.S.C. 154(b) by 243 days.

(21) Appl. No.: 13/161,289

(22) Filed: Jun. 15, 2011

(65) Prior Publication Data

US 2012/0320002 A1    Dec. 20, 2012

(51) Int. Cl.
| | |
|---|---|
| *H03H 7/38* | (2006.01) |
| *G06F 3/038* | (2013.01) |
| *G09G 5/00* | (2006.01) |
| *G09G 3/36* | (2006.01) |

(52) U.S. Cl.
USPC ............... 345/204; 333/32; 345/98; 345/211

(58) Field of Classification Search
USPC ............... 333/32–34, 124–125; 345/204, 345/211–213
See application file for complete search history.

(56) References Cited

U.S. PATENT DOCUMENTS

| | | | | |
|---|---|---|---|---|
| 4,877,971 | A * | 10/1989 | Hsue | 307/11 |
| 5,430,418 | A * | 7/1995 | Blodgett | 333/100 |
| 6,661,092 | B2 * | 12/2003 | Shibata et al. | 257/724 |
| 6,927,992 | B1 * | 8/2005 | Yen | 365/63 |
| 7,245,145 | B2 * | 7/2007 | Pax et al. | 326/30 |
| 8,213,206 | B2 * | 7/2012 | Chen | 365/51 |
| 2002/0039021 | A1 * | 4/2002 | Wong et al. | 324/103 P |
| 2003/0206080 | A1 * | 11/2003 | Echols, Jr. | 333/125 |
| 2008/0170052 | A1 * | 7/2008 | Ryu | 345/204 |
| 2008/0239184 | A1 * | 10/2008 | Kim et al. | 349/41 |
| 2008/0316382 | A1 * | 12/2008 | Sato | 349/33 |

* cited by examiner

*Primary Examiner* — Matthew Fry
(74) *Attorney, Agent, or Firm* — J.C. Patents

(57) ABSTRACT

A liquid crystal display device includes a controlling chip and a circuit wire electrically connected to the controlling chip, both disposed on a printed circuit board, and N wire sets and $2^N$ driving chips, all disposed on a glass substrate. N is a positive integer. A characteristic impedance of the circuit wire is equivalent to an output impedance of the controlling chip. The k-th wire set includes $2^{k-1}$ peripheral wires, a midpoint of the first peripheral wire in the first wire set is electrically connected to the circuit wire, characteristic impedances of the peripheral wires in the k-th wire set are $2^k$ times the output impedance, k is an integer, and $1 \le k \le N$. The driving chips are electrically connected to the N-th wire set, and each of the driving chips adjusts the input impedance according to a control information, so as to make the input impedance $2^N$ times the output impedance.

8 Claims, 6 Drawing Sheets

600

LIQUID CRYSTAL DISPLAY DEVICE

TECHNICAL FIELD

The disclosure is related to a display device, and in particular to a liquid crystal display device.

BACKGROUND OF THE INVENTION

In order to make liquid crystal panels lighter and thinner, technologies of integrating driving chips peripheral to panels into the panels or into flexible printed circuit boards (FPCB) have been developed. For example, these technologies include chip on glass (COG), chip on FPCB (COF), and WOA. Hence, a gate driver and a source driver in a liquid crystal display device are able to be directly integrated on a glass substrate and to directly utilize wires on the glass substrate to receive data and clock signals from a timing controller.

In terms of signal transmission, since the timing controller is disposed on a printed circuit board (PCB), signals output by the timing controller must be transmitted through the wires on the PCB to the glass substrate and then through wires on the glass substrate to the driving chip on the panel. Moreover, FIG. 1 is a schematic diagram showing signal transmission. As shown in FIG. 1, a transmission terminal 110 includes an output impedance $ZO_1$, and the output impedance $ZO_1$ is an equivalent impedance viewed from an output port of the transmission terminal 110. A receiving terminal 120 includes an input impedance $ZI_1$, and the input impedance $ZI_1$ is an equivalent impedance viewed from an input port of the receiving terminal 120. When the output impedance $ZO_1$ and the input impedance $ZI_1$ do not match, reflection loss occurs, thereby causing distortion in signals transmitted by the transmission terminal 110.

Therefore, for a liquid crystal display device, the timing controller is equivalent to the transmission terminal for the signals, and the driving chip is equivalent to the receiving terminal for the signals. Also, the timing controller must transmit the signals to the driving chip through two different types of wires, so that the timing controller and the driving chip often cause distortion in the signals due to impedance mismatching. At this moment, voltages output by the driving chip are not uniform, so that display quality of the liquid crystal display device is lowered.

SUMMARY OF THE INVENTION

The disclosure provides a liquid crystal display device which achieves impedance matching between a controlling chip and a driving chip through arranging a circuit wire and a wire set and adjusting characteristic impedances, thereby enhancing display quality of the liquid crystal display device.

The disclosure provides a liquid crystal display device which achieves impedance matching between the controlling chip and the driving chip through arranging the circuit wire and the wire set, adjusting the characteristic impedances, and disposing an impedance element, thereby enhancing the display quality of the liquid crystal display device.

The disclosure provides a liquid crystal display device which includes a controlling chip, a circuit wire, N wire sets, and $2^N$ driving chips, wherein N is a positive integer. The controlling chip is disposed on a PCB and includes an output impedance. The circuit wire is disposed on the printed circuit board, wherein a first end of the circuit wire is electrically connected to the controlling chip, and a characteristic impedance of the circuit wire is equivalent to the output impedance. The N wire sets are disposed on a glass substrate and electrically connected in sequence. In addition, the k-th wire set includes $2^{k-1}$ peripheral wires, a midpoint of the first peripheral wire of the first wire set is electrically connected to a second end of the circuit wire, and characteristic impedances of the peripheral wires in the k-th wire set are $2^k$ times the output impedance, k is an integer, and $1 \leq k \leq N$. The $2^N$ driving chips are disposed on the glass substrate and are electrically connected to the N-th wire set. Each of the driving chips includes an input impedance and adjusts the input impedance according to a control information, so as to make the input impedance $2^N$ times the output impedance.

According to an embodiment of the disclosure, when N equals 1, the liquid crystal display device includes one wire set and two driving chips, and two ends of the first peripheral wire in the first wire set are electrically connected to the first driving chip and the second driving chip, respectively.

According to an embodiment of the disclosure, when N is equal to or greater than 2, two ends of the i-th peripheral wire in the j-th wire set are electrically connected to midpoints of the (2i−1)-th and 2i-th peripheral wires in the (j+1)-th wire set, respectively, wherein j is an integer, $1 \leq j \leq N-1$ is an integer, and $1 \leq i \leq 2^{j-1}$.

According to an embodiment of the disclosure, the controlling chip is a timing controller, and the $2^N$ driving chips include a plurality of source drivers and a plurality of gate driver.

The disclosure provides a liquid crystal display device which includes a controlling chip, two circuit wires, an impedance element, N wire sets, and $3*2^{N-1}$ driving chips, wherein N is an integer which is greater than 1. The controlling chip is disposed on a PCB and includes an output impedance. The two circuit wires are disposed on the PCB, wherein two ends of the first circuit wire are electrically connected to the controlling chip and a midpoint of the second circuit wire, respectively, a characteristic impedance of the first circuit wire is equivalent to the output impedance, and a characteristic impedance of the second circuit wire is two times the output impedance. The impedance element is disposed on the PCB, wherein the impedance element is electrically connected to the second circuit wire and is electrically connected to a grounding end through a capacitor, and an impedance value of the impedance element is four times the output impedance.

On the other hand, the N wire sets are disposed on a glass substrate and electrically connected in sequence. The first wire set is electrically connected to two ends of the second wire set, the first wire set includes three peripheral wires, the k-th wire set includes $3*2^{k-2}$ peripheral wires, k is an integer, and $2 \leq k \leq N$. Furthermore, the characteristic impedance of the first peripheral wire in the first wire set is two times the output impedance, characteristic impedances of the second and third peripheral wires in the first wire set are four times the output impedance, and characteristic impedances of the peripheral wires in the k-th wire set are $2^{k+1}$ times the output impedance. The $3*2^{N-1}$ driving chips are disposed on the glass substrate and are electrically connected to the N-th wire set. Each of the driving chips is able to adjust the input impedance according to the control information, so as to make the input impedance $2^{N+1}$ times the output impedance.

According to an embodiment of the disclosure, two ends of the first peripheral wire of the first wire set are electrically connected to a first end of the second circuit wire and a midpoint of the second peripheral wire of the first wire set, respectively, and a first end of the third peripheral wire of the first wire set is electrically connected to a second end of the second circuit wire.

According to an embodiment of the disclosure, when N equals 1, the liquid crystal display device includes one wire set and three driving chips, two ends of the second peripheral wire of the first wire set are electrically connected to the first driving chip and the second driving chip, respectively, and a second end of the third peripheral wire of the first wire set is electrically connected to the third driving chip.

According to an embodiment of the disclosure, when N is equal to or greater than 2, two ends of the second peripheral wire of the first wire set are electrically connected to midpoints of the first and second peripheral wires of the second wire set, respectively, and a second end of the third peripheral wire of the first wire set is electrically connected to a midpoint of the third peripheral wire of the second wire set.

In light of the above, according to the disclosure, by adjusting the characteristic impedances and arrangement of the circuit wires and wire sets, and by adjusting the input impedances of the driving chips, the impedances of the circuit wires, the wire sets, the controlling chips, and the driving chips match. Therefore, the display quality of the liquid crystal display device is enhanced.

In order to make the aforementioned and other objects, features and advantages of the disclosure comprehensible, embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
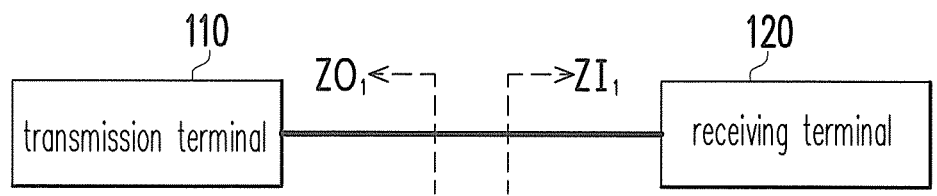
FIG. 1 is a schematic diagram showing signal transmission.

In the following description, in order to demonstrate uniformity of the present disclosure, in different embodiments, functionally and structurally similar elements will have the same reference numerals and names.

[First Embodiment]

Figure 2:
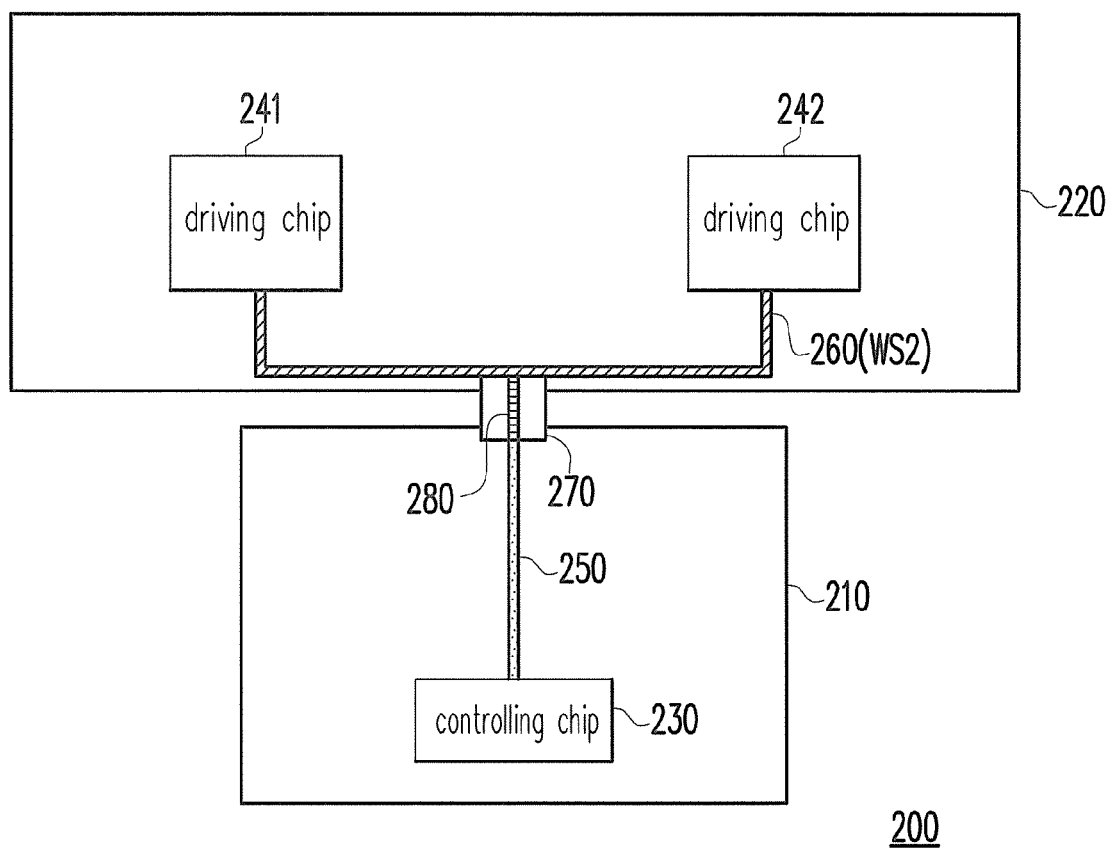
FIG. 2 is a schematic diagram showing a display device according to the first embodiment of the disclosure.

FIG. 2 is a schematic diagram showing a display device according to the first embodiment of the disclosure. Referring to FIG. 2, a liquid crystal display device 200 includes a PCB 210, a glass substrate 220, a controlling chip 230, two driving chips 241 and 242, a circuit wire 250, and one wire set WS2, wherein the wire set WS2 includes a peripheral wire 260. According to the present embodiment, the controlling chip 230 is, for example, a timing controller, and the driving chips 241 and 242 are, for example, a source driver and a gate driver which are used to drive a panel.

In physical structure, the controlling chip 230 and the circuit wire 250 are disposed on the PCB 210, and the driving chips 241 and 242 and the peripheral wire 260 are disposed on the glass substrate 220. Also, a first end of the circuit wire 250 is electrically connected to the controlling chip 230, and a second end of the circuit wire 250 is electrically connected to a midpoint of the peripheral wire 260. Moreover, two ends of the peripheral wire 260 are electrically connected to the driving chip 241 and 242, respectively. Hence, the controlling chip 230 is able to transmit signals to the glass substrate 220 through the circuit wire 250 and then transmit the signals to the driving chips 241 and 242 through the peripheral wire 260.

Furthermore, according to the present embodiment, the liquid crystal display device 200 further includes a flexible PCB 270. The flexible PCB 270 is crossed between the PCB 210 and the glass substrate 220, and the second end of the circuit wire 250 is electrically connected to the peripheral wire 260 in the wire set WS2 through the wire 280 on the flexible PCB 270. Since the wire 280 on the flexible PCB 270 is shorter, reflective loss caused by the wire 280 is negligible. In addition, in actual application, the flexible PCB 270 may be removed from the liquid display device 200 according to design requirements, and the peripheral line 260 is directly and electrically connected to the circuit wire 250. Therefore, in terms of impedance matching described below, the wire 280 on the flexible PCB 270 is omitted.

In further detail, the controlling chip 230 includes an output impedance $ZO_2$, and the output impedance $ZO_2$ is an equivalent impedance viewed from an output port of the controlling chip 230. A characteristic impedance $Z_{250}$ of the circuit wire 250 is equivalent to the output impedance $ZO_2$, meaning that $Z_{250}=ZO_2$, so that impedances of the controlling chip 230 and the circuit wire 250 match. Furthermore, in terms of the circuit wire 250 and the peripheral wire 260, since the characteristic impedance $Z_{260}$ of the peripheral wire 260 is two times the output impedance $ZO_2$, meaning that $Z_{260}=2*ZO_2$, the equivalent impedance viewed from the midpoint of the peripheral wire 260 is equivalent to the output impedance $ZO_2$. Moreover, the circuit wire 250 is electrically connected to the midpoint of the peripheral wire 260, so that the impedances of the circuit wire 250 and the peripheral wire 260 also match.

On the other hand, the driving chip 241 includes an input impedance $ZI_{21}$, and the driving chip 241 adjusts the input impedance $ZI_{21}$ according to a control information, so that the input impedance $ZI_{21}$ is two times the output impedance $ZO_2$, meaning that $ZI_{21}=2*ZO_2$. The driving chip 242 also includes an input impedance $ZI_{22}$, and the driving chip 242 adjusts the input impedance $ZI_{22}$ according to a control information, so that the input impedance $ZI_{22}$ is two times the output impedance $ZO_2$, meaning that. $ZI_{22}=2*ZO_2$. An equivalent impedance viewed from an end of the peripheral wire 260 is $2*ZO_2$, so that the impedances of the driving chip 241 and the peripheral wire 260 match, and the impedances of the driving chip 242 and the peripheral wire 260 also match.

In other words, the impedances of the controlling chip 230 and the circuit wire 250 match, the impedances of the circuit wire 250 and the peripheral wire 260 match, and the impedances of the driving chips 241 and 242 and the peripheral wire 260 match. Therefore, when the controlling chip 230 transmits the signal to the driving chip 241 and 242 through the circuit wire 250 and the peripheral wire 260, reflection loss is reduced, thereby ensuring completeness of the signal. Therefore, the display quality of the liquid crystal display device 200 is enhanced.

In order that one of ordinary skill in the art better understands the disclosure, the following describes a method of adjusting a characteristic impedance of a wire and a method of a driving chip adjusting an input impedance thereof. FIG.

Figure 3:
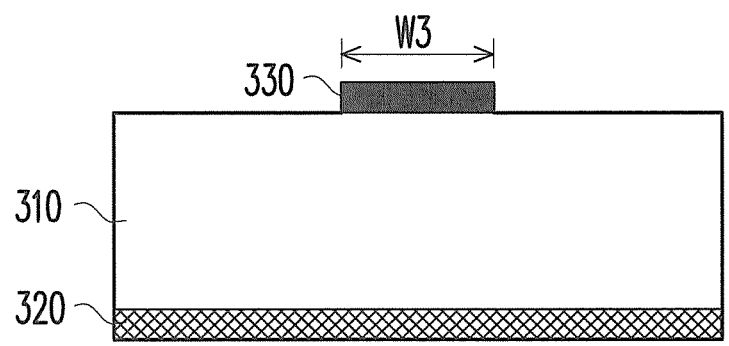
FIG. 3 is a schematic cross-sectional diagram showing wires according to an embodiment of the disclosure.

3 is a schematic cross-sectional diagram showing wires according to an embodiment of the disclosure. Referring to FIG. 3, a wire 330 is disposed on a surface of a substrate 310, and a grounding layer 320 is disposed on another surface of the substrate 310. Moreover, a characteristic impedance Zc of the wire 330 may be represented as $Zc=(L/C)^{0.5}$, wherein L is an inductance per unit length of the wire, and C is a capacitance per unit length of the wire. Therefore, when adjusting the characteristic impedance, the wire 330 is able to adjust the magnitude of the characteristic impedance thereof by adjusting a width W3 thereof. In other words, one of ordinary skill in the art is able to achieve the characteristic impedance required by the wires by adjusting to the widths of the circuit wire 250 and the peripheral wire 260 in FIG. 2.

Figure 4:
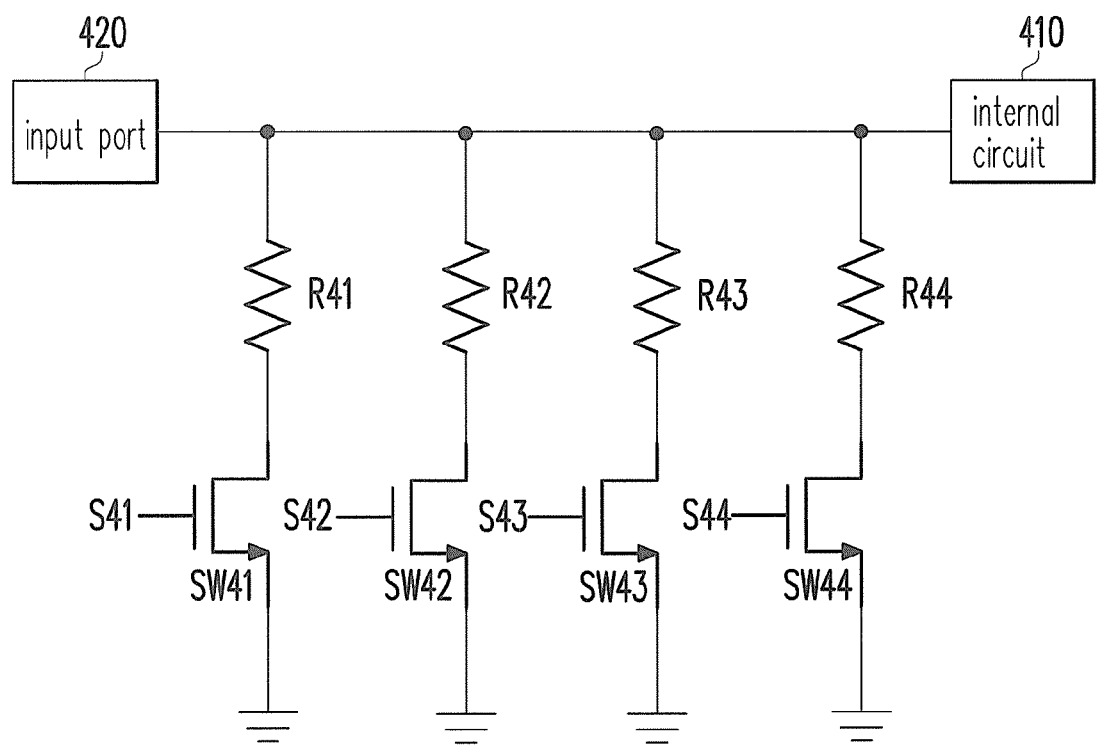
FIG. 4 is a schematic circuit diagram of a driving chip according to an embodiment of the disclosure.

FIG. 4 is a schematic circuit diagram of a driving chip according to an embodiment of the disclosure. Referring to FIG. 4, a driving chip 400 includes an internal circuit 410, an input port 420, a plurality of resistors R41-R44, and a plurality of switches SW41-SW44. A first end of each of the resistors R41-R44 is electrically connected to the input port 420 of the driving chip 400. The switches SW41-SW44 respectively correspond to the resistors R41-R44. Moreover, first ends of the switches SW41-SW44 are electrically connected to second ends of the resistors R41-R44, and second ends of the switches SW41-SW44 are electrically connected to a grounding end. According to the present embodiment, an impedance value of each of the resistors R41-R44 is four times the output impedance $ZO_2$ of the controlling chip 230, meaning that $R41=R42=R43=R44=4*ZO_2$.

Operationally, the driving chip 400 generates a plurality of switching signals S41-S44 according to control information D41. For example, as shown in Table 1, according to the present embodiment, a resolution of the control information D41 is two bits, so that the driving chip 400 is able to set the switching signals S41-S44 of different states according to the control information D41. For example, when a bit value of the control information is (00), the switching signals S41-S44 are at a high level. At this moment, the switches S41-S44 are all turned on, so that the resistors R41-R44 are connected in parallel, thereby making the input impedance of the driving chip 400 equal to the output impedance $ZO_2$.

TABLE 1

| Control information D41 | Switching signals S41-S44 |
|---|---|
| 00 | S41 = S42 = S43 = S44 = 1 |
| 10 | S41 = S42 = 1, S43 = S44 = 0 |
| 11 | S41 = S42 = S43 = 0, S44 = 1 |

On the other hand, when the bit value of the control information is (10), the switching signals S41 and S42 are at a high level, and the switching signals S43 and S44 are at a low level. At this moment, the switches S41 and S42 are turned on, and the switches S43 and S44 are turned off, so that the resistors R41 and R42 are connected in parallel, thereby making the input impedance of the driving chip 400 two times the output impedance $ZO_2$. Similarly, when the control information D41 is (11), the input impedance of the driving chip 400 is four times the output impedance $ZO_2$. In other words, the driving chip 400 is able to adjust the input impedance according to the control information D41, so as to make the input impedance and the peripheral wire match. For example, if the driving chips 241 and 242 in FIG. 1 are realized by the driving chip 400 in FIG. 4, the driving chips 241 and 242 may set the bit value of the control information therein to (10), so that the input impedances $ZI_{21}$ and $ZI_{22}$ thereof are two times the output impedance $ZO_2$.

[Second Embodiment]

Figure 5:
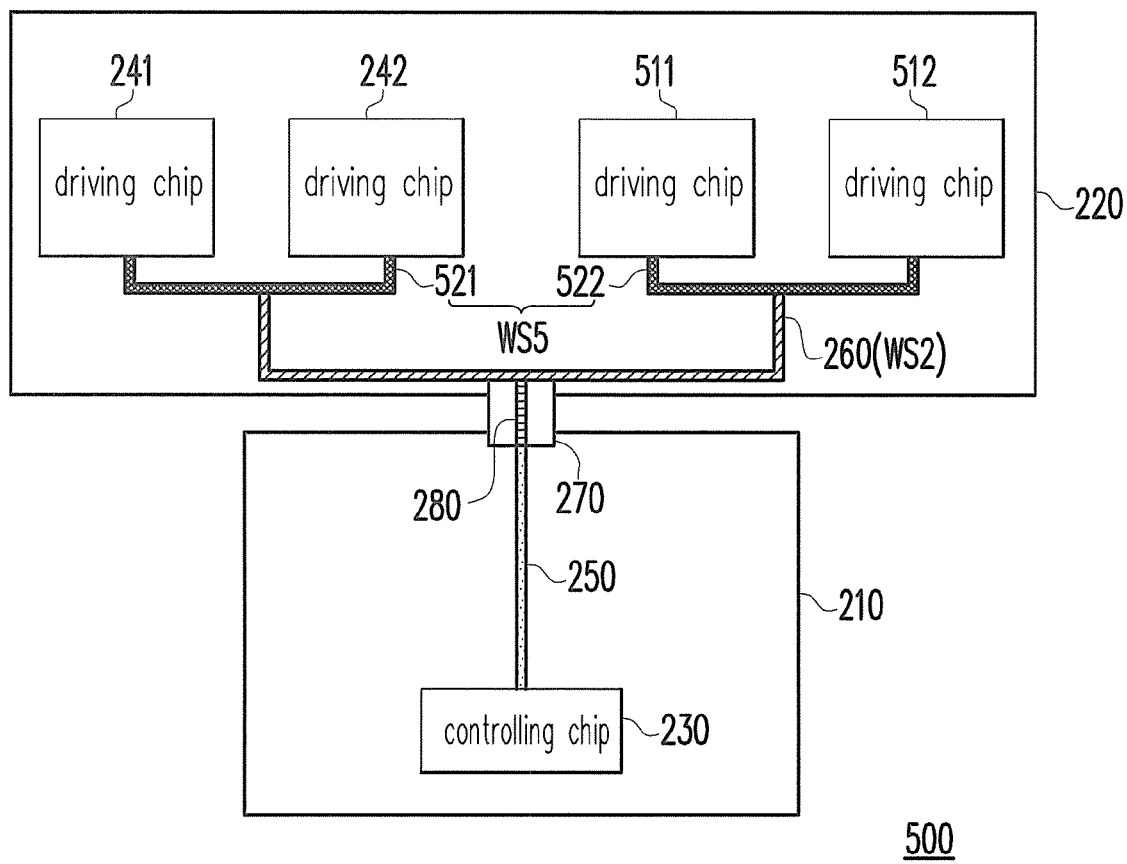
FIG. 5 is a schematic diagram showing a display device according to the second embodiment of the disclosure.

FIG. 5 is a schematic diagram showing a display device according to the second embodiment of the disclosure. Referring to FIG. 5, a main difference between the second embodiment and the first embodiment is that a liquid crystal display device 500 further includes a wire set WS5 and driving chips 511-512. In other words, the liquid crystal display device includes two wire sets WS2 and WS5 and four driving chips 241-242 and 511-512. The first wire set WS2 includes one peripheral wire 260, the second wire set WS5 includes two peripheral wires 521 and 522, meaning that a k-th wire set includes $2^{k-1}$ peripheral wires, wherein N is a number of the wire sets, k is an integer, and $1 \leq k \leq N$.

In detail, according to the second embodiment, the two ends of the first peripheral wire 260 in the first wire set WS2 are respectively connected to midpoints of the first and second peripheral wires 521 and 522 in the second wire set WS5. In other words, when N is equal to or greater than 2, two ends of the i-th peripheral wire in the j-th wire set are electrically connected to midpoints of the (2i−1)-th and 2i-th peripheral wires in the (j+1)-th wire set, respectively, wherein j is an integer, $1 \leq j \leq N-1$ is an integer, and $1 \leq i \leq 2^{j-1}$. Moreover, two ends of the first peripheral wire 521 in the second wire set WS5 are electrically connected to the first driving chip 241 and the second driving chip 242, respectively, and two ends of the second peripheral wire 522 in the second wire set WS5 are electrically connected to the third driving chip 511 and the fourth driving chip 512, respectively.

Furthermore, the characteristic impedances $Z_{521}$ and $Z_{522}$ of the peripheral wires 521 and 522 in the second wire set WS5 are four times the output impedance $ZO_2$, meaning that $Z_{521}=Z_{522}=4*ZO_2$. Hence, the equivalent impedance viewed from the midpoint of the peripheral wire 521 is two times the input impedance $ZO_2$, and the equivalent impedance viewed from the midpoint of the peripheral wire 522 is two times the input impedance $ZO_2$. In addition, the equivalent impedance viewed from an end of the peripheral wire 260 is $2*ZO_2$, so that the impedances of the peripheral wire 260 and the peripheral wire 521 match, and the impedances of the peripheral wire 260 and the peripheral wire 522 match.

On the other hand, the driving chip 241 is able to adjust the input impedance $ZI_{21}$ according to the control information, so as to make the input impedance $ZI_{21}$ four times the output impedance $ZO_2$. Similarly, the driving chip 242 adjusts the input impedance $ZI_{22}$ thereof to four times the output impedance $ZO_2$. Also, the driving chip 511 also adjusts an input impedance $ZI_{51}$ thereof to four times the output impedance $ZO_2$, and the driving chip 512 adjusts an input impedance $ZI_{52}$ thereof to four times the output impedance $ZO_2$. In other words, according to the present embodiment, $ZI_{21}=ZI_{22}=ZI_{51}=ZI_{52}=4*ZO_2$.

The equivalent impedance viewed from the end of the peripheral wire 521 is $4*ZO_2$, so that the impedances of the driving chip 241 and the peripheral wire 521 match, and the impedances of the driving chip 242 and the peripheral wire 521 also match. Similarly, the equivalent impedance viewed from the end of the peripheral wire 522 is $4*ZO_2$, so that the impedances of the driving chip 511 and the peripheral wire 522 match, and the impedances of the driving chip 512 and the peripheral wire 522 also match.

In other words, the impedances of the controlling chip 230 and the circuit wire 250 match, the impedances of the circuit wire 250 and the peripheral wire 260 match, the impedances of the peripheral wire 260 and the peripheral wires 521-522 match, and the impedances of the peripheral wires 521-522 and the driving chips 241-242 and 511-512 respectively match. Therefore, when the controlling chip 230 transmits the signal to the driving chips 241-242 and 511-512 through the circuit wire 250 and the wire sets WS2 and WS5, reflection loss is reduced, thereby ensuring completeness of the signal. Therefore, the display quality of the liquid crystal display device 500 is enhanced. The detailed structure of the liquid crystal display device 500 is described in the first embodiment and is hence not repeatedly described.

It should be noted that according to the first embodiment, the liquid crystal display device 200 includes one wire set WS2 and $2^1$ driving chips, meaning that N=1, and the input impedances of the $2^1$ driving chips are two times the output impedance, i.e. $2^N$ times. Moreover, the characteristic impedances of the peripheral wire in the wire set WS2 is $2^1$ times the output impedance. According to the second embodiment, the liquid crystal display device 500 includes two wire sets and $2^2$ driving chips, meaning that N=2, and the input impedances of the $2^2$ driving chips are four times the output impedance, i.e. $2^N$ times. Furthermore, the characteristic impedance of the peripheral wire 260 in the first wire set WS2 is $2^1$ times the output impedance, the characteristic impedances of the peripheral wires 521-522 in the second wire set are $2^2$ times the output impedance.

In other words, according to the first and second embodiments, one of ordinary skill in the art is able to expand the liquid crystal display device to include N wire sets and $2^N$ driving chips, wherein N is a positive integer. Furthermore, in terms of the characteristic impedances of the peripheral wires, the characteristic impedances of the peripheral wires in the k-th wire set is $2^k$ times the output impedance, wherein k is an integer, and 1≤k≤N. Moreover, in terms of the input impedances of the driving chips, the driving chips adjust the input impedance thereof to $2^N$ times the output impedance.

[Third Embodiment]

Figure 6:
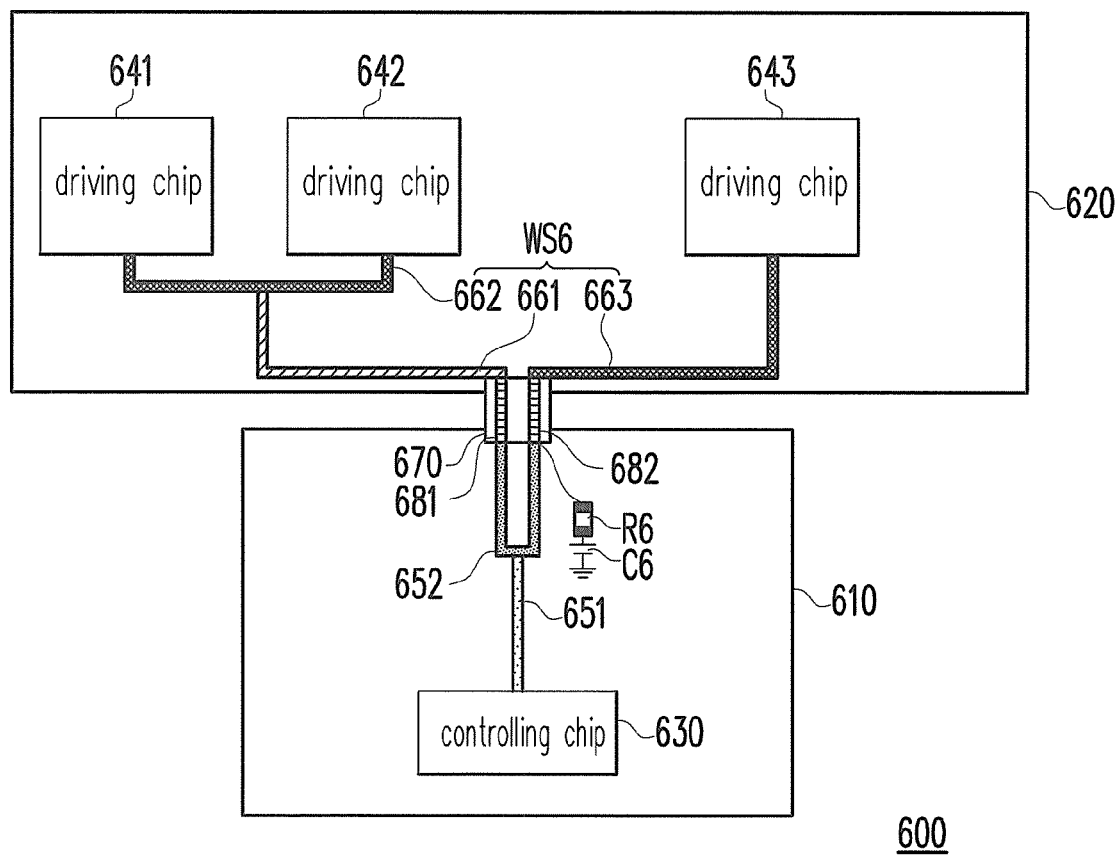
FIG. 6 is a schematic diagram showing a display device according to the third embodiment of the disclosure.

FIG. 6 is a schematic diagram showing a display device according to the third embodiment of the disclosure. Referring to FIG. 6, a liquid crystal display device 600 includes a PCB 610, a glass substrate 620, a controlling chip 630, three driving chips 641-643, two circuit wires 651-652, one wire set WS6, and an impedance element R6, wherein the wire set WS6 includes peripheral wires 661-663. According to the present embodiment, the controlling chip 630 is, for example, a timing controller, and each of the driving chips 641-643 is, for example, a source driver and a gate driver used to drive a panel, and the impedance element R6 is, for example, a resistor.

In actual structure, the controlling chip 630, the circuit wires 651 and 652, and the impedance element R6 are disposed on the PCB 610, and the driving chips 641-643 and the wire set WS6 are disposed on the glass substrate 620. Also, a first end of the circuit wire 651 is electrically connected to the controlling chip 630, and a second end of the circuit wire 651 is electrically connected to a midpoint of the circuit wire 652. Moreover, the impedance element R6 is electrically connected to the circuit wire 652 and is electrically connected to a grounding end through a capacitor C6.

Also, in terms of the wire set WS6, two ends of the peripheral wire 661 are electrically connected to a first end of the circuit wire 652 and a midpoint of the peripheral wire 662, respectively, and a first end of the peripheral wire 663 is electrically connected to the second end of the circuit wire 652. Moreover, two ends of the peripheral wire 662 are electrically connected to the driving chips 641 and 642, respectively, and a second end of the peripheral wire 663 is electrically connected to the driving chip 643. Hence, the controlling chip 630 is able to transmit signals to the glass substrate 620 through the circuit wires 651-652 and then transmit the signals to the driving chips 641-643 through the wire set WS6.

Furthermore, according to the present embodiment, the liquid crystal display device 600 further comprises a flexible PCB 670. The flexible PCB 670 is crossed between the PCB 610 and the glass substrate 620, and two ends of the circuit wire 652 are able to be electrically connected to the peripheral wires 661 and 663 in the wire set WS6 through wires 681 and 682 on the flexible PCB 670. Since the wires 681 and 682 on the flexible PCB 670 are shorter, reflective loss caused by the wires 681 and 682 is negligible. Moreover, in actual application, the flexible PCB 670 may be removed from the liquid display device 600 according to design requirements, and the wire set WS6 is directly and electrically connected to the circuit wire 652. Therefore, in terms of impedance matching described below, the wires 681 and 682 on the flexible PCB 670 are omitted.

In further detail, the controlling chip 630 includes an output impedance $ZO_6$, and the output impedance $ZO_6$ is an equivalent impedance viewed from an output port of the controlling chip 630. A characteristic impedance $Z_{651}$ of the circuit wire 651 is equivalent to the output impedance $ZO_6$, meaning that $Z_{651}=ZO_6$, so that impedances of the controlling chip 630 and the circuit wire 651 match. Furthermore, the characteristic impedance $Z_{652}$ of the circuit wire 652 is two times the output impedance $ZO_6$, meaning that $Z_{652}=2*ZO_6$, so that the equivalent impedance viewed from the midpoint of the circuit wire 652 is equivalent to the output impedance $ZO_6$. Moreover, the circuit wire 651 is electrically connected to the midpoint of the peripheral wire 652, so that the impedances of the circuit wire 651 and circuit wire 652 match.

On the other hand, in terms of the circuit wire 652 and the wire set WS6, the characteristic impedance $Z_{661}$ of the peripheral wire 661 in the wire set WS6 is two times the output impedance $ZO_6$, meaning that $Z_{661}=2*ZO_6$. In addition, the equivalent impedance viewed from the end of the circuit wire 652 is two times the output impedance $ZO_6$, so that the impedances of the circuit wire 652 and the peripheral wire 661 match. Furthermore, the characteristic impedances $Z_{662}$ and $Z_{663}$ of the peripheral wires 662 and 663 are four times the output impedance $ZO_6$, meaning that $Z_{662}=Z_{663}=4*ZO_6$, so that the impedance value of the impedance element R6 is four times the output impedance.

Since the peripheral wire 663 and the impedance element R6 are connected in parallel in terms of electrical connection, an equivalent resistance after parallel connection of the two is two times the output impedance $ZO_6$. Therefore, the impedance of the circuit wire 652 is able to match the equivalent resistance after parallel connection of the two above. In addition, in terms of the peripheral wire 661 and the peripheral wire 662, the equivalent impedance viewed from the end of the peripheral wire 661 is two times the output impedance $ZO_6$, so that the equivalent impedance viewed from the midpoint of the peripheral wire 662 is two times the output impedance $ZO_6$. Therefore, the impedances of the peripheral wire 661 and the peripheral wire 662 match.

Furthermore, the driving chip 641 includes an input impedance $ZI_{61}$, and the driving chip 641 adjusts the input impedance $ZI_{61}$ according to a control information, so that the input impedance $ZI_{61}$ is four times the output impedance $ZO_6$. For example, if the driving chip 641 is realized by the driving chip 400 in FIG. 4, the driving chip 641 is able to set the bit value therein to (11), so as to make the input impedance $ZI_{61}$ four times the output impedance $ZO_6$. Similarly, the driving chip 642 adjusts an input impedance $ZI_{62}$ thereof to four times the output impedance $ZO_6$, and the driving chip 643 also adjusts an input impedance $ZI_{63}$ thereof to four times the output impedance $ZO_6$, meaning that $ZI_{61}=ZI_{62}=ZI_{63}=4*ZO_6$. It should be noted that the equivalent impedance viewed from the end of the peripheral wire 662 is $4*ZO_2$, so that the impedances of the driving chip 641 and the peripheral wire 662 match, and the impedances of the driving chip 642 and the peripheral wire 662 also match. In addition, the equivalent impedance viewed from the end of the circuit wire 663 is $4*ZO_6$, so that the impedances of the circuit wire 643 and the peripheral wire 663 match.

In other words, the impedances of the controlling chip 630 and the circuit wire 651 match, the impedances of the circuit wire 651 and the circuit wire 652 match, the impedances of the circuit wire 652 and wire set WS6 match, and the impedances of the wire set WS6 and the driving chips 641-643 also match. Therefore, when the controlling chip 630 transmits signals to the driving chips 641-643 through the circuit wires 651 and 652 and the wire set WS6, reflection loss is reduced, thereby ensuring completeness of the signal. Therefore, the display quality of the liquid crystal display device 600 is enhanced.

It should be noted that compared with the second embodiment (FIG. 5), midpoints of three additional peripheral wires may be electrically connected to the two ends of the peripheral wire 662 and the second end of the peripheral wire 663, and the three additional peripheral wires are viewed as a second wire set. Therefore, through the three additional wire sets, the number of the driving chips of the liquid crystal display device 600 is increased to six. Furthermore, in order that the impedances of the second wire set and the first wire set match, the characteristic impedances of the three peripheral wires in the second wire set are $2^3$ times the output impedance $ZO_6$. Furthermore, in order that the impedances of the second wire set and the driving chip match, the input impedance of the driving chip is also adjusted to $2^3$ times the output impedance $ZO_6$.

Through deduction, according to the third embodiment, one of ordinary skill in the art is able to expand the liquid crystal display device 600 to include N wire sets and $3*2^{N-1}$ driving chips, wherein N is an integer which is greater than 1. Furthermore, the k-th wire set includes $3*2^{k-2}$ peripheral wires, wherein k is an integer, and $2 \leq k \leq N$. In the k-th wire set, the characteristic impedances of the peripheral wires are $2^{k+1}$ times the output impedance, and the input impedances of the driving chips are $2^{N+1}$ the output impedance. Furthermore, when N is greater than 2, two ends of the i-th peripheral wire in the j-th wire set are electrically connected to midpoints of the (2i−1)-th and 2i-th peripheral wires in the (j+1)-th wire set, respectively, wherein j is an integer, $2 \leq j \leq N-1$, i is an integer, and $1 \leq i \leq 3*2^{j-2}$.

In light of the above, according to the disclosure, by adjusting the characteristic impedances and arrangement of the circuit wires and wire sets, and by adjusting the input impedances of the driving chips, the impedances of the circuit wires, the wire sets, the controlling chips, and the driving chips match. Therefore, whether the liquid crystal display device controls one, two, or three driving chips through one controlling chip, impedances of the controlling chip and the driving chip match through the arrangement and structures according to the disclosure, thereby enhancing the display quality of the liquid crystal display device.

It will be apparent to those skilled in the art that various modifications and variations can be made to the disclosure without departing from the scope or spirit of the disclosure. In view of the foregoing, it is intended that the disclosure cover modifications and variations of this disclosure provided they fall within the scope of the following claims and their equivalents.

What is claimed is:

1. A liquid crystal display device, comprising:
a controlling chip, disposed on a printed circuit board and comprising an output impedance;
two circuit wires, disposed on the printed circuit board, wherein two ends of the first circuit wire are electrically connected to the controlling chip and a midpoint of the second circuit wire, respectively, a characteristic impedance of the first circuit wire is equivalent to the output impedance, and a characteristic impedance of the second circuit wire is two times the output impedance;
an impedance element, disposed on the printed circuit board, wherein the impedance element is electrically connected to the second circuit wire and is electrically connected to a grounding end through a capacitor, and an impedance value of the impedance element is four times the output impedance;
N wire sets, disposed on a glass substrate and electrically connected in sequence, wherein N is an integer which is greater than 0, the first wire set is electrically connected to two ends of the second circuit wire, the first wire set comprises three peripheral wires, a characteristic impedance of the first peripheral wire in the first wire set is two times the output impedance, characteristic impedances of the second and third peripheral wires in the first wire set are four times the output impedance, and when N is greater than 1, the k-th wire set comprises $3*2^{k-2}$ peripheral wires, characteristic impedances of the peripheral wires in the k-th wire set are $2^{k+1}$ times the output impedance, k is an integer, and $2 \leq k \leq N$; and
$3*2^{N-1}$ driving chips, disposed on the glass substrate and electrically connected to the N-th wire set, wherein each of the driving chip adjusts an input impedance according to a control information, so as to make the input impedance $2^{N+1}$ times the output impedance.

2. The liquid crystal display device as claimed in claim 1, wherein two ends of the first peripheral wire of the first wire set are electrically connected to a first end of the second circuit wire and a midpoint of the second peripheral wire of the first wire set, respectively, and a first end of the third peripheral wire of the first wire set is electrically connected to a second end of the second circuit wire.

3. The liquid crystal display device as claimed in claim 2, wherein when N equals 1, the liquid crystal display device comprises one wire set and three driving chips, two ends of the second peripheral wire in the first wire set are electrically connected to the first driving chip and the second driving chip, respectively, and a second end of the third peripheral wire of the first wire set is electrically connected to the third driving chip.

4. The liquid crystal display device as claimed in claim 2, wherein when N is equal to or greater than 2, two ends of the second peripheral wire of the first wire set are electrically connected to midpoints of the first and second peripheral wires of the second wire set, respectively, and a second end of the third peripheral wire of the first wire set is electrically connected to a midpoint of the third peripheral wire of the second wire set.

5. The liquid crystal display device as claimed in claim 1, wherein when N is greater than 2, two ends of the i-th peripheral wire in the j-th wire set are electrically connected to midpoints of the (2i−1)-th and 2i-th peripheral wires in the (j+1)-th wire set, respectively, wherein j is an integer, $2 \leq j \leq N-1$, i is an integer, and $1 \leq i \leq 3*2^{j-2}$.

6. The liquid crystal display device as claimed in claim 1, further comprising:
   a flexible printed circuit board, crossed between the printed circuit board and the glass substrate, wherein two ends of the second circuit wire are electrically connected to the first wire set through a wire on the flexible printed circuit board.

7. The liquid crystal display device as claimed in claim 1, wherein each of the driving chips generates a plurality of switching signals according to the control information, and each of the driving chips comprises:
   a plurality of resistors, wherein a first end of each of the resistors is electrically connected to an input port of the corresponding driving chip; and
   a plurality of switches, respectively corresponding to the resistors, wherein a first end of each of the switches is electrically connected to a second end of the corresponding resistor, a second end of each of the switches is electrically connected to a grounding end, and the switches adjust conductive states thereof according to the switching signals.

8. The liquid crystal display device as claimed in claim 1, wherein the controlling chip is a timing controller, and the driving chips comprise a plurality of source drivers and a plurality of gate drivers.

* * * * *